(12) United States Patent
Okazaki

(10) Patent No.: US 7,635,167 B2
(45) Date of Patent: Dec. 22, 2009

(54) SEAT BELT SHOULDER ANCHOR

(75) Inventor: Hidetsugu Okazaki, Dublin, OH (US)

(73) Assignee: Honda Motor Co., Ltd, Tokyo (JP)

( * ) Notice: Subject to any disclaimer, the term of this patent is extended or adjusted under 35 U.S.C. 154(b) by 399 days.

(21) Appl. No.: 11/468,597

(22) Filed: Aug. 30, 2006

(65) Prior Publication Data

US 2008/0054703 A1   Mar. 6, 2008

(51) Int. Cl.
B60R 22/00   (2006.01)

(52) U.S. Cl. .................. 297/483; 297/482; 280/808

(58) Field of Classification Search ............. 297/469, 297/468, 473, 482, 483; 280/808; 242/377
See application file for complete search history.

(56) References Cited

U.S. PATENT DOCUMENTS

| | | | |
|---|---|---|---|
| 2,195,334 A | | 3/1940 | Lethern |
| 4,549,749 A | | 10/1985 | Thomas |
| 4,902,041 A | * | 2/1990 | Corbett et al. ............. 280/807 |
| 5,088,794 A | | 2/1992 | Iwami et al. |
| 5,123,673 A | | 6/1992 | Tame |
| 5,149,133 A | | 9/1992 | Alvarado |
| 5,364,170 A | | 11/1994 | West |
| 5,390,982 A | | 2/1995 | Johnson et al. |
| 5,441,332 A | | 8/1995 | Verellen |
| 5,503,461 A | | 4/1996 | Schreier |
| 5,544,917 A | * | 8/1996 | Loxton et al. ............ 280/801.2 |
| 5,599,070 A | | 2/1997 | Pham et al. |
| 5,609,396 A | | 3/1997 | Loxton et al. |
| 5,658,051 A | | 8/1997 | Vega et al. |
| 5,681,081 A | | 10/1997 | Lindner et al. |
| 5,704,684 A | | 1/1998 | Dukatz et al. |
| 5,716,073 A | | 2/1998 | Redman |
| 5,722,732 A | | 3/1998 | Haldenwanger |
| 5,984,419 A | * | 11/1999 | Partington et al. ......... 297/473 |
| 5,988,758 A | | 11/1999 | Heintzelman et al. |
| 6,056,366 A | | 5/2000 | Haynes et al. |
| 6,065,810 A | * | 5/2000 | Koenig et al. ............. 297/482 |
| 6,237,945 B1 | | 5/2001 | Aboud et al. |
| 6,305,713 B1 | | 10/2001 | Pywell et al. |
| 6,637,825 B2 | | 10/2003 | Janz |
| 6,726,287 B1 | * | 4/2004 | Janz ......................... 297/483 |
| 7,011,341 B2 | | 3/2006 | Herberg et al. |
| 7,390,022 B2 | * | 6/2008 | Burghardt .................. 280/808 |
| 2002/0089164 A1 | | 7/2002 | Rouhana et al. |

(Continued)

FOREIGN PATENT DOCUMENTS

EP   1116633 A2   7/2001

(Continued)

Primary Examiner—Joseph F Edell
(74) Attorney, Agent, or Firm—Mark Duell; Michael A. Forhan; Eley Law Firm Co.

(57) ABSTRACT

A seat belt shoulder anchor for a vehicle seat. An anchor member having a web guide is attached to a frame of the vehicle seat. A housing having an opening generally encloses the anchor member and is coupled to the seat such that the web guide extends through the housing opening. A garnish having an opening is coupled to the housing such that the garnish substantially closes off the housing opening and the web guide extends through the garnish opening. The garnish opening is isolated by the web guide from a seat belt web extending through an aperture in the web guide.

23 Claims, 5 Drawing Sheets

U.S. PATENT DOCUMENTS

| | | |
|---|---|---|
| 2003/0160498 A1 | 8/2003 | Boelstler et al. |
| 2004/0012242 A1 | 1/2004 | White |
| 2004/0036270 A1 | 2/2004 | Roychoudhury et al. |
| 2004/0160051 A1 | 8/2004 | Cheng |

FOREIGN PATENT DOCUMENTS

| | | |
|---|---|---|
| WO | WO0222406 A1 | 3/2002 |

* cited by examiner

SEAT BELT SHOULDER ANCHOR

FIELD

The present invention relates generally to vehicle occupant restraints, in particular to a shoulder belt anchor having a web guide.

BACKGROUND

Vehicle occupant restraints, including seat belt devices, are important and well-known components of vehicle safety systems. If a vehicle experiences a severe impact a properly belted-in occupant is generally held in place by the seat belt's webbing, thereby avoiding many serious, if not fatal, physical collisions with the vehicle interior and/or being thrown from the vehicle. Since their introduction seat belts have saved countless lives and reduced the severity of injury in countless more.

A three-point seat belt system is a common type of safety restraint system for automobiles. Three-point seat belt systems have three fixation points on the seat belt webbing. The upper end of a shoulder belt is extendable and retractable adjacent the shoulder of an occupant, providing the first fixation point. The lower end of the shoulder belt extends to a lap belt via a sliding seat belt latch. One end of the lap belt is continuously connected to the lower end of the shoulder belt. The other end is anchored and disposed on the outboard side of the occupant, resulting in the second fixation point. The seat belt latch has a webbing loop through which the lap belt is threaded such that the seat belt latch is slidable along the lap belt, and a tongue plate that is selectably engageable with a seat belt buckle. The seat belt buckle is likewise anchored and disposed on the inboard side of the occupant, generating the third fixation point. Three-point seat belt restraint systems improve the performance of occupant restraint over two-point seat belt restraint systems by restricting both the occupant's upper and lower body motions.

Vehicle designers are increasingly turning to occupant restraints wherein the seat belts are integrated with the vehicle seats. In such restraints the seat belts are anchored to the seat frame which is, in turn, anchored to the vehicle. Accordingly, the seat belts can be located more optimally to accommodate variations in seat position and orientation. These configurations also have an advantage in that the seat assembly, together with the occupant restraint, can be installed as a single unit in the passenger compartment at the time of vehicle manufacture.

Integrated occupant restraint systems typically locate the seat belt retractor on the seat's seatback frame or beneath the seat cushion on the seat's frame and route the seat belt webbing upwardly along a rear portion of the seat back. A belt-reversing device is utilized to change the direction of the webbing from an orientation generally parallel to the seat back to an orientation generally perpendicularly thereto as it exits a housing attached to the seat back proximate an occupant's shoulder. The webbing is thus positioned to extend generally diagonally across the occupant's upper body. The housing may include a web guide that allows the webbing to move slidably into and out of the housing without twisting or binding. The web guide is incorporated into a trim garnish that closes off an opening in the housing used during seat manufacture to install the webbing.

A drawback of current occupant restraint systems is that the webbing, which moves slidably through the web guide, can exert a pulling force upon the web guide while the belt is extended. This pulling force can dislodge the garnish from the housing, potentially causing twisting or binding of the webbing, which in turn can cause the occupant discomfort and/or interfere with the proper operation of the safety restraint system. There is a need for a web guide that is not subject to being dislodged due to movement of a safety belt web therethrough.

SUMMARY

A seat belt shoulder anchor is disclosed according to an embodiment of the present invention. The shoulder anchor comprises an anchor member that is attached to the frame of the seat back. A web guide is attached to or made integral with the shoulder anchor member. A housing fits over the anchor member such that the web guide extends through an opening of the housing. A trim garnish mounts to the housing and closes off the housing opening, the web guide extending through an aperture of the garnish. The seat restraint webbing slidably contacts a web support of the shoulder anchor, the support changing the direction of the webbing from generally parallel to the seat back to generally perpendicularly thereto. The webbing is routed through the web guide and exits the housing. The aperture of the garnish is isolated from the webbing as it exits the shoulder anchor, the garnish thus being resistant to dislodging from the housing due to the sliding movement of the webbing.

One aspect of the present invention is a seat belt shoulder anchor for a vehicle seat. The shoulder anchor comprises an anchor member attached to a frame of the vehicle seat, the anchor member having a web guide. A housing having an opening generally encloses the anchor member and is coupled to the seat such that the web guide extends through the housing opening. A garnish having an opening is coupled to the housing such that the garnish substantially closes off the housing opening and the web guide extends through the garnish opening. The garnish opening is isolated by the web guide from a seat belt web extending through an aperture in the web guide. In various embodiments of the present invention the anchor member may include a web support. In some embodiments the garnish may include a hook portion that engages a recess in the anchor member. In other embodiments the housing and garnish may be secured to the seat with one or more fasteners, the fasteners optionally being concealed by a fastener cover.

Another aspect of the present invention is a method for anchoring a shoulder belt to a vehicle seat. The method includes the steps of: attaching an anchor member to a frame of the vehicle seat, the anchor member having a web guide; enclosing the anchor member with a housing, the housing being oriented such that the web guide extends through an opening in the housing; and coupling a garnish to the housing such that the garnish substantially closes off the housing opening and the web guide extends through an opening in the garnish. The garnish opening is isolated by the web guide from a seat belt web extending through an aperture in the web guide.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
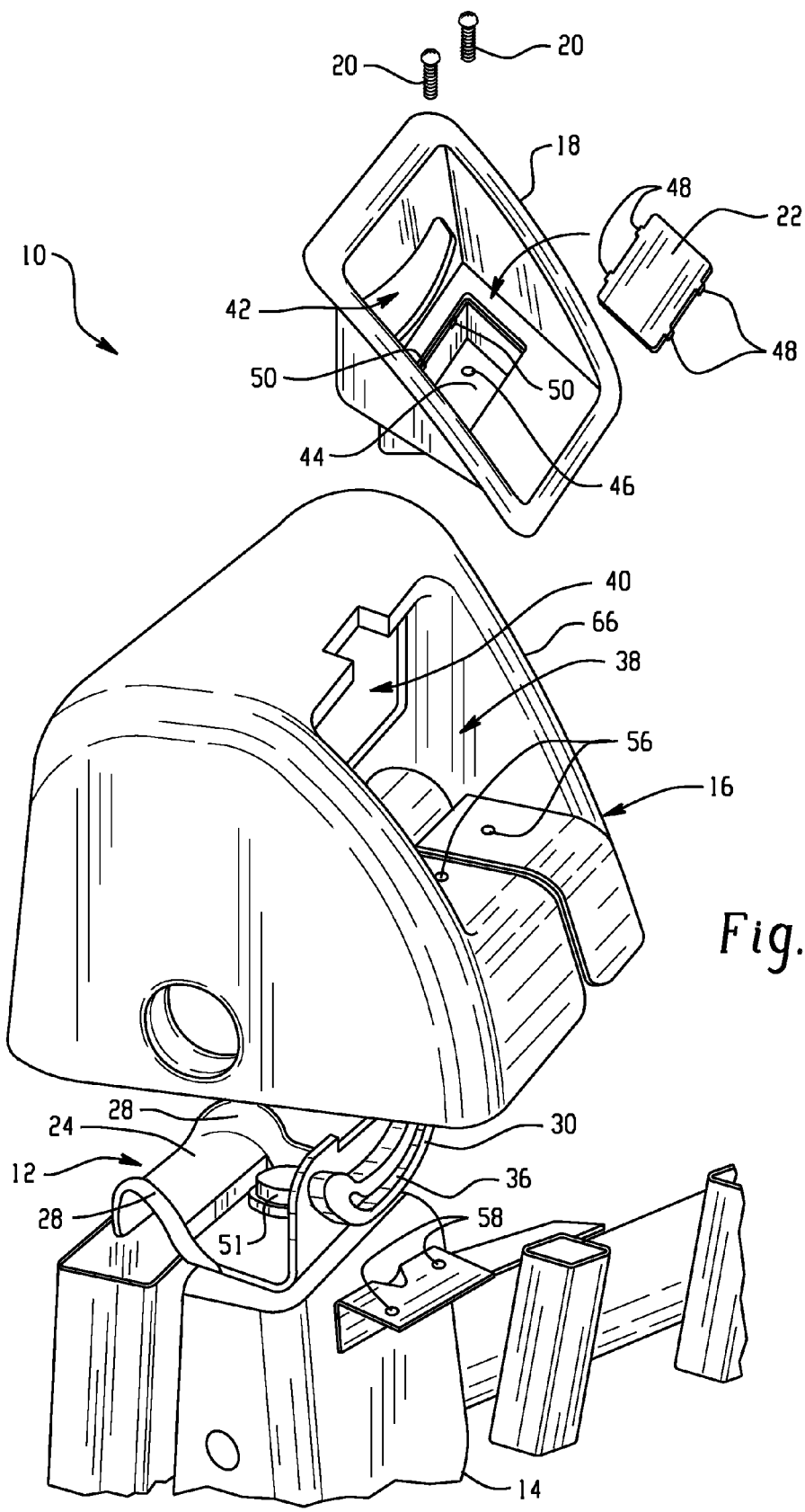
FIG. 1 is an exploded view of a seat belt shoulder anchor according to an embodiment of the present invention.

The general arrangement of a seat belt shoulder anchor 10 is shown in FIG. 1 according to an embodiment of the present invention. Shoulder anchor 10 comprises an anchor member 12 that is configured to attach to a seat back frame 14 of a vehicle seat. A housing 16 fits over anchor member 12, generally enclosing the anchor member. A trim garnish 18 is attached to housing 16 with one or more fasteners as at 20, which also secure the housing to the frame 14. A fastener cover 22 is attached to garnish 18 to generally conceal the fasteners 20.

Figure 2:
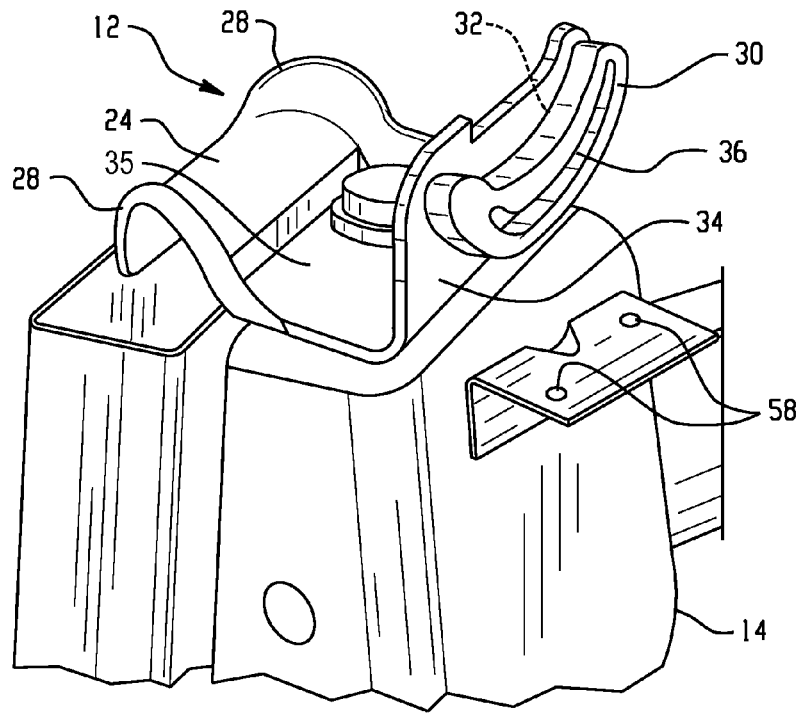
FIG. 2 is a front perspective view of an anchor member according to an embodiment of the present invention.
Figure 3:
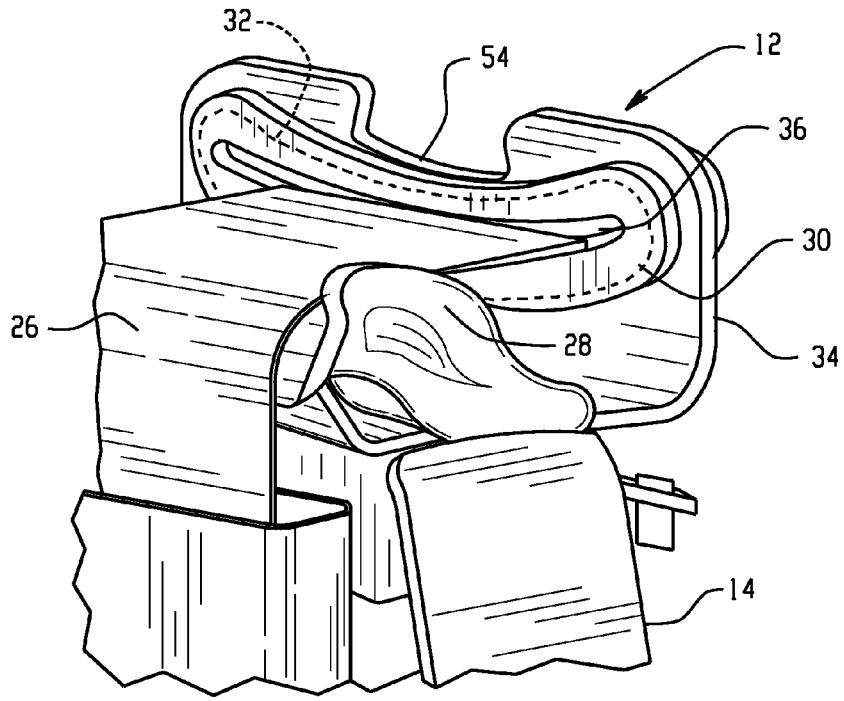
FIG. 3 is a rear perspective view of the anchor member of FIG. 2.

With reference now to FIGS. 2 and 3 in combination with FIG. 1, anchor member 12 includes a web support 24 that is shaped to slidably receive a seat belt web 26. Web support 24 is generally saddle-shaped and includes a pair of sidewalls 28. Anchor member 12 further includes an opening 32 extending through a generally vertical tab 34. Tab 34 is spaced apart from web support 24 by a generally horizontal mounting portion 35.

With continued reference to FIGS. 2 and 3 a web guide 30 is coupled to opening 32 in tab 34 of anchor member 12. Web guide 30 is provided with an aperture 36 that is generally arc-shaped to urge web 26 toward the center of the aperture. Aperture 36 is preferably sized to allow web 26 to smoothly move slidably therethrough, yet resist twisting and binding of the web.

The various features of anchor member 12 including, without limitation, web support 24, sidewalls 28, opening 32 and tab 34 may be formed as a unitary piece from any suitable material that is compatible with other components of seat belt shoulder anchor 10 and the expected environment. Non-limiting examples of such materials include metals such as steel, plastic, and composites. Anchor member 12 may be fabricated using any conventional processes such as, without limitation, molding, stamping, casting and machining, and may also be finished by such processes as painting, plating and coating, or left unfinished.

Likewise, web guide 30 may be made from any suitable material compatible with other components of seat belt shoulder anchor 10 and the expected environment such as, for example, plastic, composites and rubber, and may further incorporate a grained pattern and/or a predetermined color for aesthetic purposes. In some embodiments web guide 30 is molded about opening 32 of tab 34. In other embodiments web guide 30 may be made as a separate component and coupled to opening 32 in any conventional manner, such as adhesive, a snap fit and an interference fit. In still other embodiments anchor member 12 and web guide 30 may be made as a unitary piece, the features thereof being formed by any of molding, stamping, casting and machining.

With reference again to FIG. 1, housing 16 is generally hollow, being sized and shaped to generally enclose anchor member 12. Housing 16 further includes a cavity 38 shaped to receive garnish 18. An opening 40 is disposed in a sidewall of cavity 38, extending through the housing and into the hollow area. Housing 16 may be made from any suitable material compatible with other components of seat belt shoulder anchor and the expected environment. Non-limiting example materials include metals such as steel and aluminum, plastics, and composites. Housing 16 may be fabricated using any conventional process such as, without limitation, molding, stamping, casting and machining. Housing 16 may be finished by such processes as painting, plating and coating, or left unfinished.

Garnish 18 is shaped to generally conform to cavity 38 of housing 16 and to generally close off housing opening 40. Garnish 18 further includes an opening 42 that is oriented to be positioned proximate housing opening 40 when garnish 18 is coupled to housing 16. A cavity 44 formed in garnish 18 is sized and shaped to receive one or more fasteners 20, the fasteners extending through corresponding mounting holes 46 in the cavity.

A fastener cover 22 closes off cavity 44. Fastener cover 22 comprises a plurality of tabs 48 that engage corresponding slots 50 in garnish 18. Alternatively, fastener cover 22 may be secured to garnish 18 in any other conventional manner including, without limitation, adhesives and slidable cover tabs that engage corresponding slots in the garnish.

Figure 4:
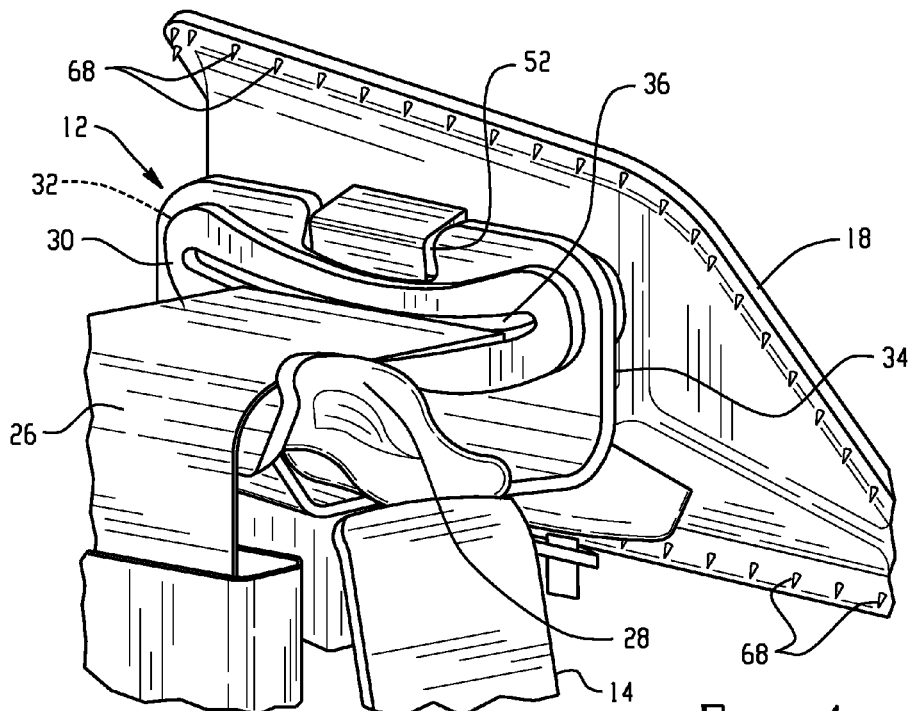
FIG. 4 shows a garnish trim attached to an anchor member according to an embodiment of the present invention.
Figure 5:
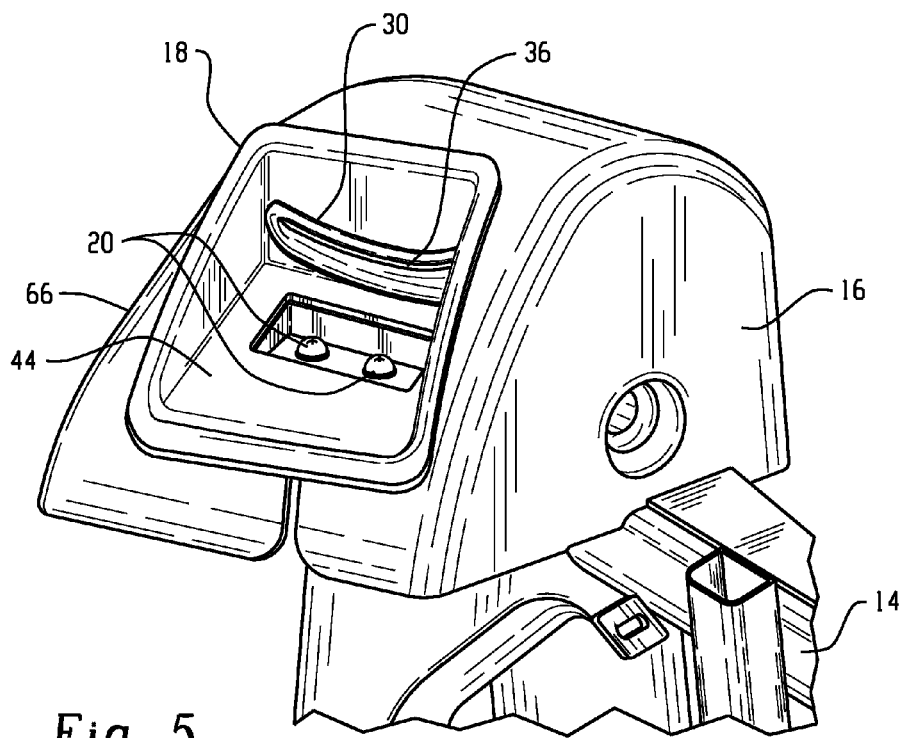
FIG. 5 shows the garnish trim of FIG. 4 assembled to a housing according to an embodiment of the present invention.
Figure 6:
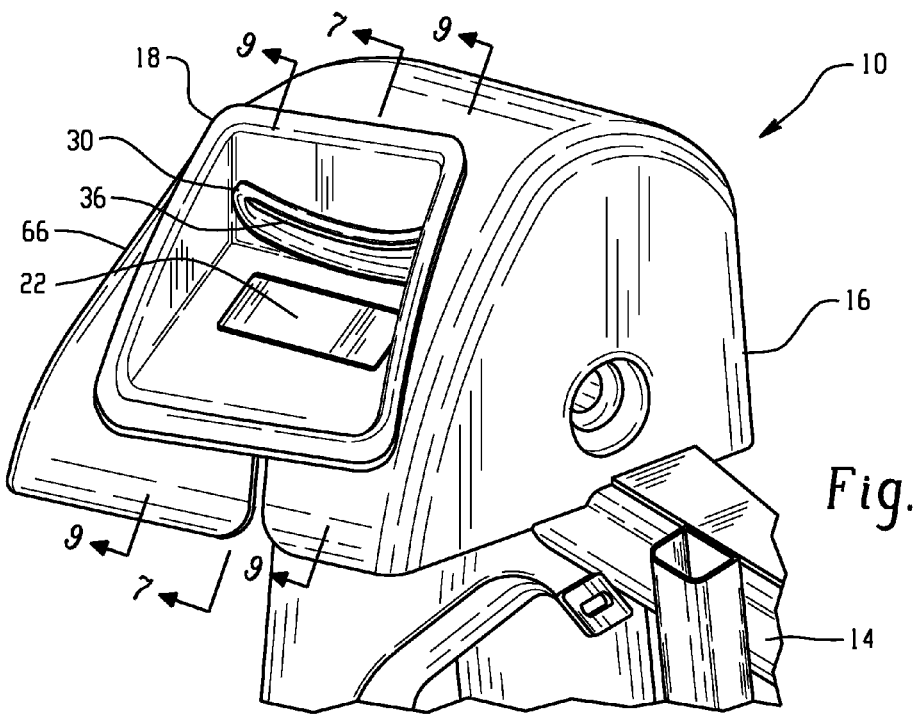
FIG. 6 depicts a fastener cover attached to the garnish of FIG. 5 according to an embodiment of the present invention.
Figure 8:
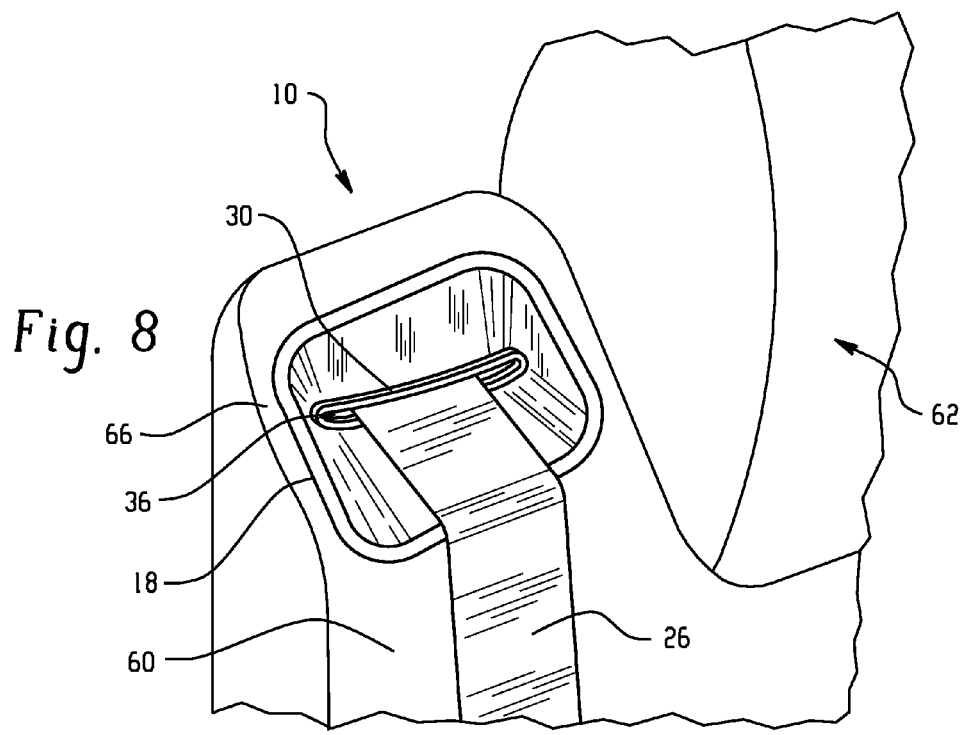
FIG. 8 is a perspective view of a seat belt shoulder anchor according to an embodiment of the present invention.
Figure 7:
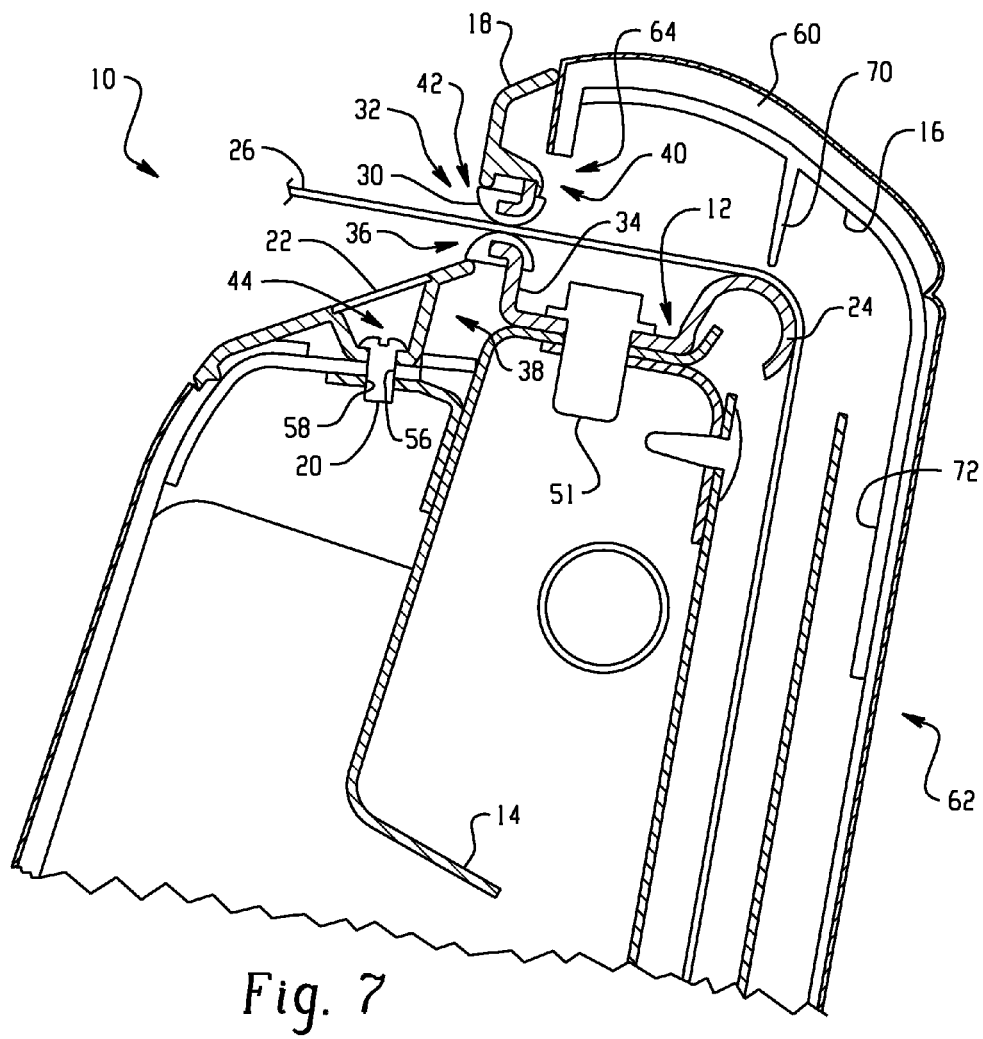
FIG. 7 is a view in section of a seat belt shoulder anchor according to an embodiment of the present invention.

Referring now to FIGS. 1 through 8 in combination, seat belt shoulder anchor 10 is assembled by first attaching anchor member 12 to frame 14 in any suitable manner, such as with one or more fasteners 51, crimping and welding. Housing 16 is then placed over anchor member 12, generally enclosing the anchor member with web guide 30 extending through opening 40 of the housing. Garnish 18 is fitted to cavity 38 and is positioned such that a hook portion 52 of the garnish engages a recess 54 of anchor member 12, as shown in FIG. 4, and web guide 30 extends through opening 42 of the garnish, as shown in FIG. 5. Fasteners 20, which may be screws, are inserted, in turn, through mounting holes 46 of the garnish and corresponding mounting holes 56 of housing 16 to engage corresponding mounting holes 58 of frame 14 as shown in FIGS. 1, 5 and 7. Fasteners 20 are tightened, securing both housing 16 and garnish 18 to the seat frame 14. Fastener cover 22 is then coupled to garnish 18 by engaging tabs 48 of the cover to slots 50 of the garnish as shown in FIGS. 1, 6 and 7. Seat belt web 26, which travels generally proximate seat back frame 14, is routed over web support 24, exiting through web guide 30 as shown in FIGS. 7 and 8.

In operation, web 26 moves slidably over web support 24 and through web guide 30 as the seat belt is extended for use by an occupant or retracted upon disengagement by the occupant. Web 26 likewise moves slidably over web support 24 and through web guide 30 as the seat belt slightly extends and retracts to accommodate movement of the occupant. The saddle shape and sidewalls 28 of web support 24 cooperate with web guide 30 to slidably retain web 26 generally centered upon anchor member 12 as the web is extended and retracted. The arc shape of aperture 36 likewise urges web 26 toward the center of the aperture and allows the web to move smoothly and slidably therethrough, yet resist twisting and binding of the web. As can be seen in FIGS. 7 and 8, opening 42 of garnish 18 is isolated from web 26 by web guide 30 as the web exits shoulder anchor 10, the garnish accordingly being resistant to dislodging from the housing due to movement of the web.

In some embodiments of the present invention housing 16 may be covered with a fabric covering material 60, as shown in FIGS. 7 and 8. Fabric covering 60 may be, for example, a fabric matching that of a vehicle seat 62, or may be a portion of a unitary fabric covering the entirety of the seat. Fabric covering 60 may include an opening 64 shaped to generally correspond to that of housing cavity 38 and sized slightly smaller than a periphery 66 of the cavity. In addition, garnish 18 may include a plurality of small, relatively sharp spikes 68 (see FIG. 4) configured to engage the fabric covering 60. When shoulder anchor 10 is assembled, fabric covering 60 is fitted over housing 16 such that fabric opening 64 is generally aligned with housing cavity 38. Garnish 18 is installed to housing 16 and fasteners 20 are tightened in the manner previously described, urging the spikes 68 around the periphery of the garnish toward periphery 66 of cavity 38. Spikes 68 engage and grip fabric covering 60, which is intermediate housing 16 and garnish 18, thereby holding the fabric in place and preventing it from pulling away from the garnish.

Housing 16 may also optionally include a projecting member 70, as shown in FIG. 7. When seat belt should anchor 10 is assembled the projecting member 70 extends away from a wall 72 of housing 16 and toward web support 24. Projecting member 70 cooperates with web support 24 to generally surround and slidably retain web 26 generally centered upon anchor member 12.

Figure 9:
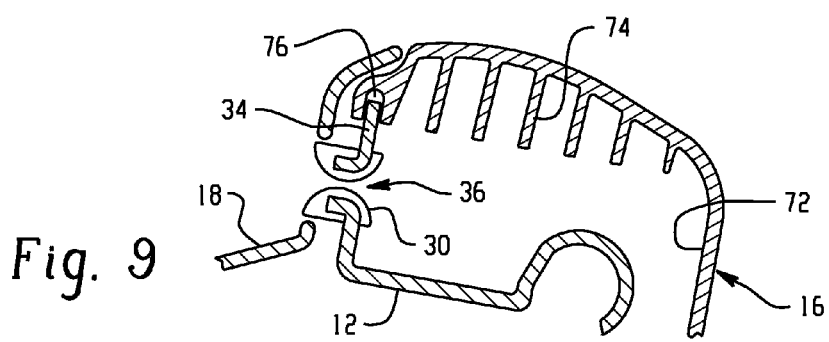
FIG. 9 is a partial view in section of a housing and an anchor member of a seat belt shoulder anchor according to another embodiment of the present invention.

With reference now to FIGS. 6 and 9, some embodiments of the present invention housing 16 may further optionally include one or more ribs 74 extending away from wall 72 in a predetermined grid pattern. Ribs 74 absorb energy when housing 16 is impacted by an object (such as in the event of a vehicle collision), thereby limiting damage to the object. The number, spacing, length, and thickness of ribs 74 may be varied as desired to achieve the desired rigidity and energy-absorption characteristics for housing 16. Furthermore, in some embodiments the grid pattern may comprise a single set of generally parallel ribs while in other embodiments the grid may comprise two or more sets of generally parallel ribs, the sets being oriented at a predetermined angle with respect to each other, e.g., perpendicularly.

With continued reference to FIG. 9, in still other embodiments of the present invention housing 16 may include a slot 76 formed by a pair of ribs 74, into which tab 34 is fitted when seat belt shoulder anchor 10 is assembled. Tab 34 and slot 76 cooperate to support the housing 16 and hold it in place.

While this invention has been shown and described with respect to a detailed embodiment thereof, it will be understood by those skilled in the art that changes in form and detail thereof may be made without departing from the scope of the claims of the invention.

What is claimed is:

1. A seat belt shoulder anchor for a vehicle seat, comprising:
   a stationary, unitary anchor member attached to a frame of the vehicle seat, the anchor member comprising a generally vertical tab spaced apart from a web support by a generally horizontal mounting portion, the tab further including a tab opening therethrough;
   a stationary web guide coupled to and extending through the tab opening;
   a housing having an opening, the housing generally enclosing the anchor member and being coupled to the seat such that the web guide extends through the housing opening; and
   a stationary garnish having a garnish opening, the garnish being coupled to the housing such that the garnish substantially closes off the housing opening and the web guide extends through the garnish opening,
   wherein the garnish opening is isolated by the web guide from a seat belt web extending through an aperture in the web guide.

2. The seat belt shoulder anchor of claim 1 wherein the housing further comprises a projecting member extending away from a wall of the housing and toward the web support.

3. The seat belt shoulder anchor of claim 1 wherein the anchor member comprises a metal web support and a plastic web guide.

4. The seat belt shoulder anchor of claim 3 wherein the web guide is molded to the anchor member.

5. The seat belt shoulder anchor of claim 1 wherein the garnish further comprises a hook portion configured to engage a recess of the anchor member.

6. The seat belt shoulder anchor of claim 1 wherein the garnish and housing are secured with at least one fastener extending through the garnish, housing and frame.

7. The seat belt shoulder anchor of claim 6 wherein the fastener is a screw.

8. The seat belt shoulder anchor of claim 6, further comprising a fastener cover, the fastener cover being attachable to the housing to substantially conceal the fastener.

9. The seat belt shoulder anchor of claim 8 wherein the fastener cover further comprises a plurality of tabs engageable to corresponding slots in the housing.

10. The seat belt shoulder anchor of claim 1, further comprising a fabric material between the housing and the garnish, the fabric substantially covering the housing and having an opening generally corresponding to the periphery of a cavity disposed in the housing.

11. The seat belt shoulder anchor of claim 10 wherein the garnish further comprises a plurality of spikes configured to engage the fabric material about the periphery of the cavity.

12. The seat belt shoulder anchor of claim 1 wherein the housing further includes at least one rib.

13. The seat belt shoulder anchor of claim 12 wherein a pair of ribs form a slot, the slot being engaged by a tab of the anchor member.

14. A seat belt shoulder anchor for a vehicle seat, comprising:
   a stationary, unitary anchor member attached to a frame of the vehicle seat, the anchor member comprising a generally vertical tab spaced apart from a web support by a generally horizontal mounting portion, the tab further including a tab opening therethrough;
   a stationary web guide coupled to and extending through the tab opening;
   a housing having an opening, the housing generally enclosing the anchor member and being coupled to the seat such that the web guide extends through the housing opening;
   a stationary garnish having a garnish opening and a hook portion, the hook portion being configured to engage a recess of the anchor member and the garnish being coupled to the housing such that the garnish substantially closes off the housing opening and the web guide extends through the garnish opening;
   at least one fastener extending through the garnish, housing and frame to secure the garnish and housing to the seat; and
   a fastener cover attachable to the housing to substantially conceal the fastener,
   wherein the garnish opening is isolated by the web guide from a seat belt web routed over the web support and extending through an aperture in the web guide.

15. A method for anchoring a shoulder belt to a vehicle seat, comprising the steps of:
- attaching a stationary, unitary anchor member to a frame of the vehicle seat, the anchor member comprising a generally vertical tab spaced apart from a web support by a generally horizontal mounting portion, the tab further including a tab opening therethrough;
- coupling a stationary web guide to the tab opening, the web guide extending through the tab opening;
- enclosing the anchor member with a housing, the housing being oriented such that the web guide extends through an opening in the housing and
- coupling a stationary garnish to the housing such that the garnish substantially closes off the housing opening and the web guide extends through an opening in the garnish,
- wherein the garnish opening is isolated by the web guide from a seat belt web extending through an aperture in the web guide.

16. The method of claim 15, further comprising the step of forming a web support in the anchor member.

17. The method of claim 15, further comprising the steps of:
- forming a hook portion in the garnish and
- engaging the hook portion to a corresponding recess of the anchor member.

18. The method of claim 15, further comprising the step of securing the garnish and housing to the seat with at least one fastener extending through the garnish, housing and frame.

19. The method of claim 18, further comprising the step of attaching a fastener cover to the housing to substantially conceal the fastener.

20. The method of claim 19, further comprising the steps of:
- forming a plurality of tabs in the fastener cover;
- forming a plurality of slots in the housing corresponding to the tabs and
- engaging the corresponding tabs and slots to secure the fastener cover to the garnish.

21. The method of claim 15, further comprising the step of placing a fabric material between the housing and the garnish, the fabric substantially covering the housing and having an opening generally corresponding to the periphery of a cavity disposed in the housing.

22. The method of claim 21, further comprising the step of forming a plurality of spikes in the garnish and engaging the spikes with the fabric material about the periphery of the cavity.

23. A seat belt shoulder anchor produced according to the method of claim 15.

* * * * *